J. T. DEMPSTER.
METHOD OF AND APPARATUS FOR RECORDING ELECTRICAL QUANTITIES.
APPLICATION FILED JULY 18, 1913.

1,208,512.                                      Patented Dec. 12, 1916.

Witnesses:
George W. Tilden
J. Ellis Glenn

Inventor:
John T. Dempster,
by
His Attorney.

UNITED STATES PATENT OFFICE.

JOHN THOS. DEMPSTER, OF SCHENECTADY, NEW YORK, ASSIGNOR TO GENERAL ELECTRIC COMPANY, A CORPORATION OF NEW YORK.

METHOD OF AND APPARATUS FOR RECORDING ELECTRICAL QUANTITIES.

1,208,512.  Specification of Letters Patent.  Patented Dec. 12, 1916.

Application filed July 18, 1913. Serial No. 779,768.

*To all whom it may concern:*

Be it known that I, JOHN T. DEMPSTER, a subject of the King of Great Britain, residing at Schenectady, county of Schenectady, State of New York, have invented certain new and useful Improvements in Methods of and Apparatus for Recording Electrical Quantities, of which the following is a specification.

My invention relates to the art of recording the magnitude of an electrical characteristic or quantity in an electrical installation.

More particularly my invention relates to the art of recording the flow of current or the rate of consumption of energy in an electrical installation.

The object of my invention is to provide a novel method of recording an electrical characteristic of an installation, and further to provide a novel type of apparatus for carrying out this method.

The particular object of my invention in providing this method of recording is to obtain in a convenient, compact and readily comprehensible form a record of the variations of an electrical characteristic of an installation.

More specifically the object of my invention in this regard is to provide a novel method of and means for obtaining a record of the flow of current or the rate of consumption of energy in an installation, from which record the magnitude of the demand of the installation upon the source of current or power, and the length of time any particular demand exists, can readily be obtained.

Other objects of my invention, as for example improvements in the mechanical construction of electrical recording instruments, will be described in detail hereinafter.

The novel features of my invention which I consider to be patentable are definitely indicated in the claims appended hereto.

The novel method of recording which I have invented and the operation of an instrument for carrying out this method will be understood from the following description taken in connection with the accompanying drawings, in which—

Figure 1:
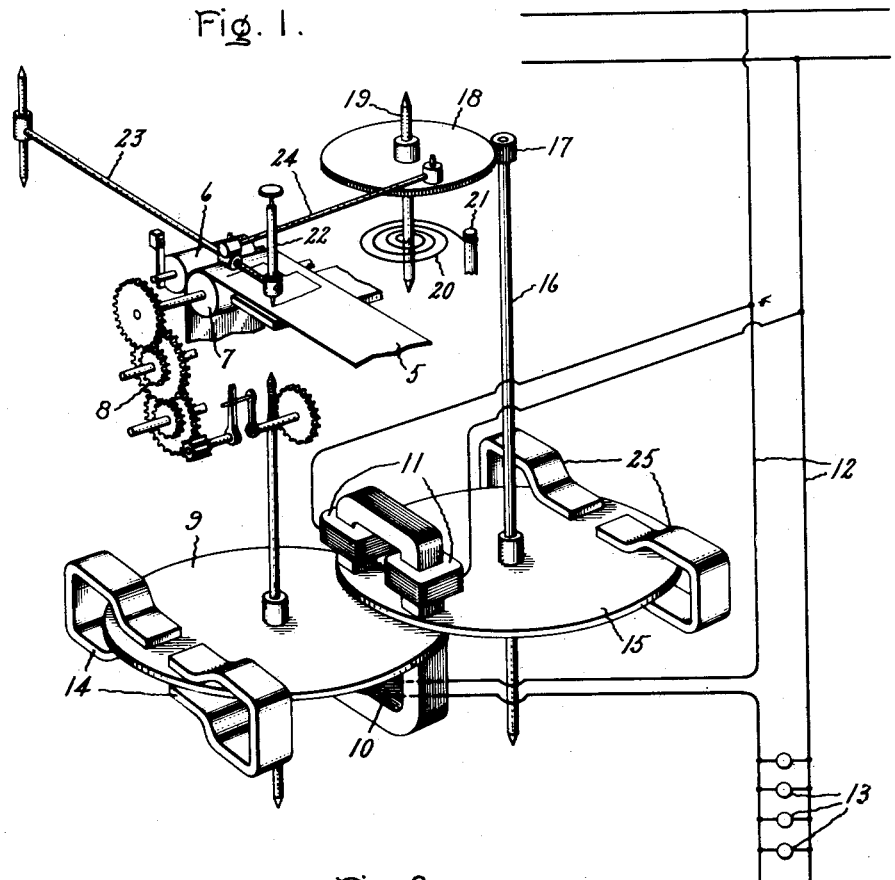
Figure 2:
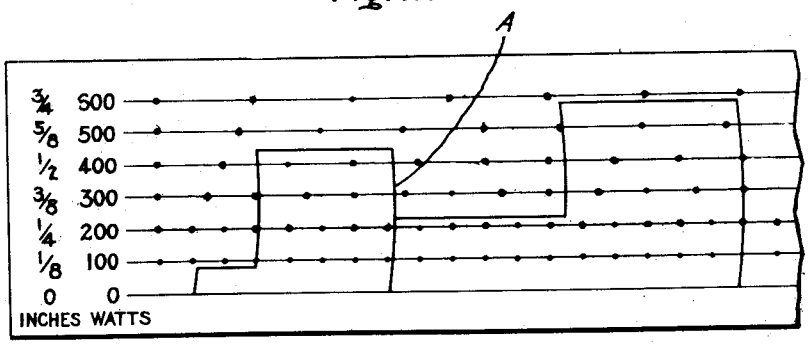

Figure 1 is a diagrammatic view in perspective of the novel construction of instrument which I have devised for carrying out the method of my invention, and Fig. 2 illustrates a section of the record sheet employed in my novel instrument and a portion of a record obtained thereon.

In carrying out the novel method of my invention, I provide a record sheet, preferably having suitable reference marks thereon, as hereinafter more fully described. My method of recording consists in moving this record sheet at a rate which is some function of an electrical characteristic of the installation, measuring the electrical characteristic to be recorded, and recording the measurements of such characteristic upon the record sheet. Where the record sheet is moved at a rate which is a function of the electrical characteristic to be recorded a continuous curve may be obtained upon the record sheet whose rectangular coördinates in both directions are functions of the electrical characteristic to be recorded. One of the important applications of my invention is that of recording the flow of current in an electrical installation. As applied to this application the method of my invention consists in measuring the flow of current in the installation, recording on the record sheet such measurements of current, and moving the record sheet at a rate which is a function of, for example proportional to, the flow of current in the installation.

My invention will be best understood from a description of the novel form of instrument which I have devised.

The instrument of my invention comprises a movable record sheet 5. The record sheet is arranged to pass through cylindrical rolls 6 and 7. The roll 7 is designed as a driving roll to move the record sheet, while the roll 6 is spring-pressed against the roll 7 to insure proper progression of the record sheet. The driving roll 7 is operatively connected through gearing 8 to the rotatable disk armature 9 of an electric meter element. For the purposes of illustration I have shown in the drawings a wattmeter element of the well known induction type, but it will be evident that any electric meter element of the motor type may be employed in my electrical recording instrument. The rotatable armature 9 is mounted in the magnetic field produced by the series coil 10 and potential coils 11 of the meter element. The coils 10 and 11 are connected in the usual manner to the conductors 12 of an electrical installation supplying current to translating devices 13. The disk armature 9 is also mounted within the influence of the permanent damping magnets 14 of the usual construction. A second disk armature 15 is mounted in the magnetic field of the coils 10 and 11, and within the influence of the permanent damping magnets 25. As shown in Fig. 1 of the drawings, the armatures 9 and 15 are located in the same air gap between the coil 10 and the coils 11. The armature 15 is rigidly secured to a pivotally mounted shaft 16. A pinion 17 is secured at the upper end of the shaft 16 and meshes with a gear member or actuator 18. The actuator 18 is secured to a pivotally mounted shaft 19 and is of considerably greater diameter than the pinion 17, whereby the angle of movement of the armature 15 is greater than the corresponding angle of movement of the actuator 18.

A control spring 20 has one end secured to a fixed pin 21 and its other end secured to the shaft 19. It will thus be seen that the control spring 20 is operatively connected to the rotatable armature 15, and in effect renders the armature 15 the moving element of an indicating instrument. When the torque of the spring 20 equals the torque produced in the disk armature 15 by the field coils 10 and 11 the armature will come to rest. It will be noticed that the armature 15 will make several revolutions while the actuator 18 makes half of one revolution. In this manner I materially increase the torque of the actuator.

A marking device 22 is operatively related to the record sheet 5. The marking device may obviously be of any desired character, and for the purposes of illustration I have shown a pencil point carried at the end of a pivotally mounted arm 23. A connecting link 24 operatively connects the actuator 18 to the arm 23. Any movement of the actuator is thus transmitted to the marking device 22. The increased torque of the actuator 18, produced as hereinbefore described by the peculiar arrangement of the reducing gearing and the control spring, is of decided advantage in a curve drawing instrument of the type herein described, since it assists in reducing to a negligible factor the friction between the marking device and the record sheet.

In Fig. 2 of the drawings I have illustrated the record sheet employed in my novel instrument and a typical record produced thereon. The record sheet has a plurality of rows of horizontal reference marks. The reference marks in the lower horizontal row, indicated by numeral 100 in the figure, are nearer together than the reference marks in the other rows, and the distance between reference marks in each horizontal row increases from the bottom row to the top row. The record sheet is driven directly by the rotatable disk armature 9 and thus moves at a rate proportional to the rate of consumption of energy in the installation. It will therefore be evident that the speed of movement of the record sheet varies with the rate of consumption of energy. The reference marks on the record sheet are designed to indicate the distance the record sheet moves in a predetermined unit of time when the electrical quantity to be measured is of a predetermined magnitude. For example, assuming the rate of consumption of energy to be 100 watts, then the record sheet moves ⅛ inch per hour. If the rate of consumption of energy is 300 watts the record sheet moves ⅜ inch per hour. This relation between the rate of consumption of energy and the distance the record sheet moves in a unit of time is illustrated on the record sheet shown in Fig. 2 by the column of figures at the left-hand end of the record sheet.

The record produced by the instrument illustrated in the accompanying drawings is a continuous curve, and is shown by the line A in Fig. 2 of the drawings. The vertical coördinates of this curve with respect to the zero line 0 are proportional to the instantaneous rate of consumption of energy in the installation. It will thus be apparent that the instantaneous rate of consumption of energy is given by the vertical coördinates of the curve A, while the horizontal portions of this curve indicate the lengths of time any particular rate of consumption of energy lasted. The record produced by my improved method of recording thus gives a direct indication of the demands made by the installation upon the source of power and the lengths of time that such demands existed.

As previously suggested my invention is particularly adapted to be employed in recording the demand made by an electrical installation upon a source of power, as a central generating station. In such cases it is generally desirable to know the maximum or peak demands, the number of times such demands have occurred, and the duration of the demands. It will be evident that all of these particulars in regard to the installation's demand can readily be obtained from the record produced by my novel construction of instrument.

I have employed throughout this specification the expression "rate of consumption of energy" and "flow of current" as substantially synonymous. Where the electric meter element is of the ampere hour type, the record is obviously of the flow of current. It will be evident to those skilled in the art, however, that the record of either the flow of current or the rate of consumption of energy gives the same result.

The method of recording an electrical characteristic of an installation which I have herein described may be carried out with various other constructions of apparatus than that illustrated and described in this specification. I aim in the appended claims to cover my invention in its broadest scope, together with all modifications thereof which will be apparent to those skilled in the art.

What I claim as new and desire to secure by Letters Patent of the United States, is,—

1. The method of recording the rate of consumption of energy in an electrical installation which consists in moving a suitable record sheet at a speed proportional to the rate of consumption of energy in the installation, and simultaneously recording on said record sheet the instantaneous rate of consumption of energy in said installation.

2. An electrical recording instrument comprising in combination a movable record sheet, means for moving said record sheet at a speed proportional to the rate of consumption of electric energy, and means for imparting on said record sheet a record of the instantaneous rate of consumption of energy.

3. An electrical recording instrument comprising in combination a motor type electric meter element and an indicating electric meter element, a record sheet arranged to be moved by the motor type meter element, means for imparting a record on said record sheet, and means operatively connecting said last mentioned means to said indicating meter element.

4. An electrical recording instrument comprising in combination a watthour meter element and an indicating wattmeter element, a movable record sheet arranged to be moved by the watthour meter element, means for imparting a record on said record sheet, and means operatively connecting said last mentioned means to said indicating wattmeter element.

5. An electrical recording instrument comprising in combination a watthour meter element and an indicating wattmeter element, a movable record sheet, means actuated by the watthour meter element for moving said record sheet, means for drawing a curve upon said record sheet, and means operatively connecting said curve drawing means to the indicating wattmeter element.

6. An electrical recording instrument comprising in combination a watthour meter element and an indicating wattmeter element, a record sheet arranged to be moved by the watthour meter element, and recording means operatively related to said record sheet and connected to the indicating wattmeter element.

7. An electrical recording instrument comprising in combination a movable record sheet, an electric meter element having a rotatable shaft, an actuator adapted to be driven by said shaft, a control spring connected to said actuator, and a marking device operatively related to said record sheet and connected to said actuator.

8. An electrical recording instrument comprising in combination a movable record sheet, an electric meter element having a rotatable shaft, an actuator adapted to be driven by said shaft, the angle of movement of said shaft being greater than the corresponding angle of movement of said actuator, a control spring connected to said actuator, and a marking device operatively related to said record sheet and connected to said actuator.

9. An electrical recording instrument comprising in combination a movable record sheet, an electric meter element having field coils, a rotatable armature mounted in the magnetic field of said coils, a pivotally mounted actuator adapted to be driven by said rotatable armature, a control spring connected to said actuator, and a marking device operatively related to said record sheet and connected to said actuator.

10. An electrical recording instrument comprising in combination a watthour meter element and an indicating wattmeter element, a record sheet arranged to be moved by the watthour meter element, a marking device operatively related to said record sheet, an actuator operatively connected to said marking device, a control spring connected to said actuator, and reducing gearing operatively connecting the indicating wattmeter element to the actuator.

11. An electrical recording instrument comprising in combination an electric meter element having field coils, a rotatable armature mounted in the magnetic field of said coils, a movable record sheet, means operatively connecting said rotatable armature to said record sheet, a second rotatable armature mounted in the magnetic field of said coils, a control spring operatively connected to said second rotatable armature, means for imparting a record on said record sheet, and means operatively connecting said last mentioned means to said second rotatable armature.

12. An electrical recording instrument comprising in combination an electric meter element having field coils, a rotatable armature mounted in the magnetic field of said coils, a movable record sheet, means operatively connecting said rotatable armature to said record sheet, a second rotatable armature mounted in the magnetic field of said coils, a marking device operatively related to said record sheet, a pivotally mounted shaft operatively connected to said marking device, a control spring connected to said shaft, and reducing gearing operatively connecting said second rotatable armature and said shaft.

13. An electrical recording instrument comprising in combination an electric meter element having field coils, a rotatable armature mounted in the magnetic field of said coils, a movable record sheet, means operatively connecting said armature to said record sheet, a pivotally mounted marking device operatively related to said record sheet, an actuator, connecting means between said actuator and said marking device, a second rotatable armature mounted in the magnetic field of said coils, reducing gearing operatively connecting said second rotatable armature to said actuator, and a control spring connected to said actuator.

In witness whereof, I have hereunto set my hand this 17th day of July, 1913.

JOHN THOS. DEMPSTER.

Witnesses:
 BENJAMIN B. HULL,
 HELEN ORFORD.